June 15, 1965 S. ROMANO 3,188,843
CHANNEL SPREADING APPARATUS ADAPTABLE FOR USE
IN THE MANUFACTURE OF POCKETBOOKS
Filed Jan. 10, 1962
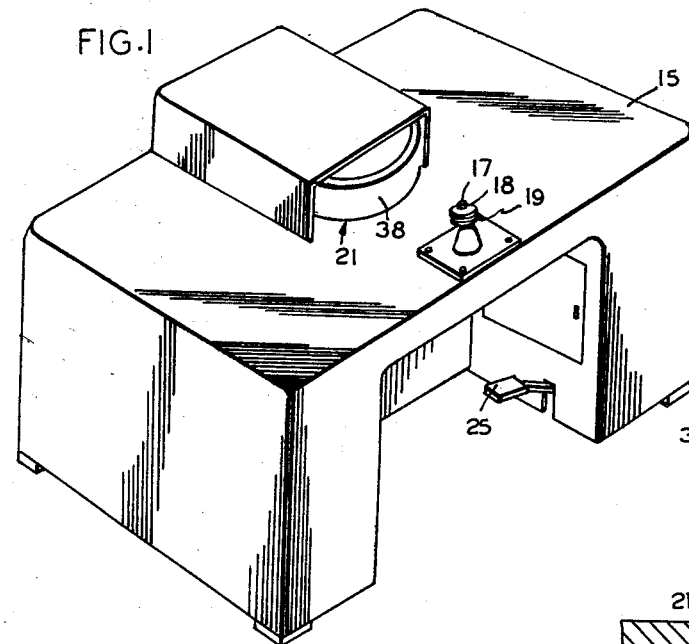
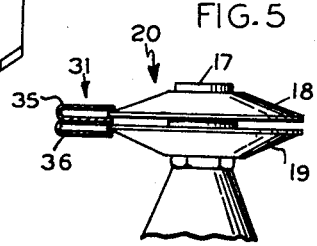
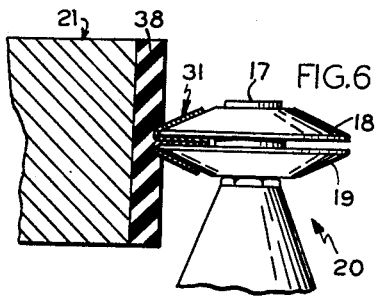
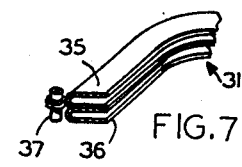
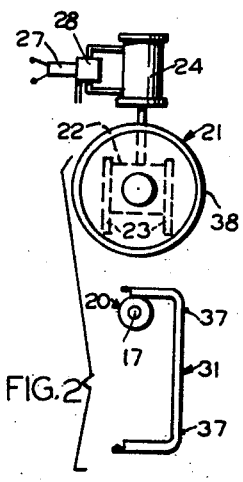
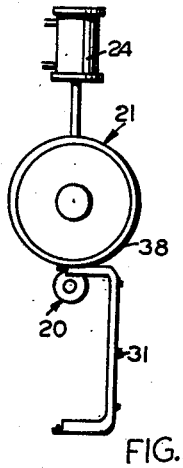
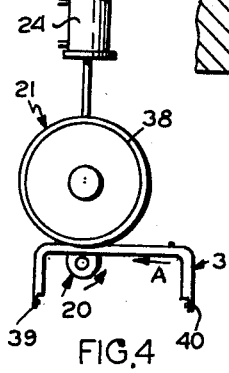
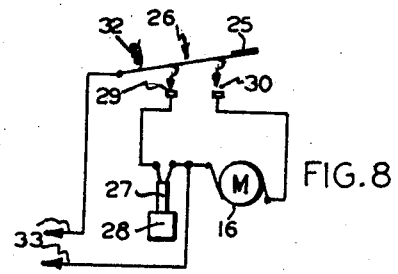
INVENTOR,
SALVATORE ROMANO,
BY
ATTORNEY.

United States Patent Office 3,188,843
Patented June 15, 1965

3,188,843
CHANNEL SPREADING APPARATUS ADAPTABLE FOR USE IN THE MANUFACTURE OF POCKETBOOKS
Salvatore Romano, Glen Cove, N.Y., assignor to Metgal Novelty Co., Inc., New York, N.Y., a corporation of New York
Filed Jan. 10, 1962, Ser. No. 165,359
3 Claims. (Cl. 72—22)

The present invention relates to a machine good for use in the manufacture of pocketbooks of the kind having a bag whose mouth rim is set in a frame of U-shapes made of metal channel, which are hinged at their distal ends. More particularly, said machine is for spreading said channels all around said U-shapes, to facilitate the mounting of the bag.

The principal object of this invention is to provide a channel spreading machine of the character mentioned, in which the operator sets the frame for engagement of one of its distal regions and then closes a switch, preferably of the pedal-operated type. From that point on, the operation of spreading the channels of the frame, is entirely automatic.

Another object thereof is to provide a machine of novel construction and mode of operation for the purpose mentioned, which is easy to work, needs no skill of the operator and which takes frames of any size and shape.

A further object of this invention is to provide a machine of the nature set forth, which will work on frames on whose exterior there may be projecting parts, as lock elements, knobs, handle hangers or attachment posts, without any manual adjustments therefor in the machine mechanism.

Still a further object of this invention is to provide a machine of the kind set forth, having the mentioned attributes and which is simple in construction, reasonable in cost to manufacture, safe in use and efficient in carrying out the purposes for which it is designed.

Other objects and advantages will become apparent as this disclosure proceeds.

For the practice of this invention, one form it may assume is to have a pair of bevelled discs in spaced relation on a motor-driven shaft; those surfaces of said discs which face each other, being flat and their spacing such that the contacting walls of a closed pocketbook frame can be entered between them. This structure constitutes the spreading wheels. There is a comparatively large pusher wheel which is an idler rotatably mounted on a slidable member attached to the piston rod of an air cylinder. Normally, this pusher wheel is away from the spreader wheels, to admit a frame between them. When the air cylinder is actuated, the pusher wheel moves towards the spreader wheels to force the frame onto the spreader wheels. The initial positioning of the frame by the operator is to have the spreader wheels contact the very end regions of the frame's channels at a distal end of the frame. This is done while the spreading wheels are at rest. An electrical circuit is provided including a pedal-operated switch means which by a single shift of its operating member, the air cylinder is operated to bring the pusher wheel to the work and thereupon the motor is actuated which causes the frame to "run" and thereby its channels spread.

In the accompanying drawing forming part of this specification, similar characters of reference indicate corresponding parts in all the views.

FIG. 1 is a pictorial view of a machine embodying the teachings of this invention.

FIG. 2 is a top plan view showing the operable mechanism for spreading the channels, apart from the framework of the machine. This is the condition the machine is in, as in FIG. 1, where the pusher roller is away from the spreading wheel structure which is at rest. A piece of work is shown as held in position by the operator against the spreader wheels. The machine is ready to be operated.

FIG. 3 is a view like FIG. 2, showing the pusher roller brought to operating position by action of the air cylinder.

FIG. 4 is another view like FIG. 2, showing the spreading wheel structure in operation.

FIG. 5 is a fragmentary elevational view of the spreader wheel structure and the work set thereagainst as in FIG. 2.

FIG. 6 is a view similar to FIG. 5, but here the spreader wheels co-operate with the pusher roller to accomplish the necessary work as in FIG. 4.

FIG. 7 is a fragmentary perspective view showing a protuberance on the work piece.

FIG. 8 is a wiring diagram of the electrical circuit employed in the embodiment illustrated.

In the drawing, the numeral 15 designates generally a suitable work bench structure with compartment space housing the motor 16, which by any well known arrangement not shown, and if desired, with some speed changing means interposed, drives the journalled vertical shaft 17 carrying the frusto-conical spreader wheels 18 and 19. The spreader wheel structure indicated generally by the numeral 20, is near the front edge of the work table. In back thereof and normally spaced therefrom, there is a comparatively large pusher roller denoted by the numeral 21, which is rotatably mounted on a carriage block 22 riding in suitable tracks 23. This block is connected to the piston rod of an air cylinder 24 which is fixed to the work bench. It is evident, that upon actuation of the cylinder, the pusher roller will be brought to and away from the spreader wheels 18, 19. An accessible pedal 25 is for operation of the switch means indicated generally by the numeral 26, which controls the actuation and deactuation of the solenoid 27 operating the valve 28 for operating the air cylinder 24, and which switch means also controls the working of the motor 16.

The switch means 26 really comprises two switches which are normally in open condition. One, indicated as 29, is for control of the valve's solenoid 27, while the other, denoted by the numeral 30, is for control of the motor 16. These switches are so arranged, that upon downward movement of the pedal 25, the switch 29 is closed to operate the air cylinder 24 whereby the pusher roller 21 is brought onto the work piece 31, and then upon further downward movement of said pedal, the switch 30 is closed to operate the motor 16. Upon release of the pedal, it will automatically return to its normal raised position, for it is so biased by the spring 32.

The circuit shown in FIG. 8 may be described as having one terminal of each of said motor 16 and the solenoid 27, connected to one of the power lines 33; that the other power line is connected to one of the terminals of each of said switches 29, 30; that the other terminal of said solenoid is connected to the other terminal of the switch 29, and that the other terminals of the motor and the switch 30 are connected.

It is to be noted that the spreader wheels 18, 19 are positioned so that their flat surfaces are opposite each other and spaced sufficiently to admit the contacting walls of the channel members 35, 36 comprising the work piece 31, and of course, such contact occurs when the said work piece is closed; such being its condition when set into and while run through the machine.

For the moment, let us disregard the presence of any handle hangers 37 or other parts projecting from the pocketbook frame 31, as well as the tire 38 on the pusher roller 21. We have said frame, whose channel members 35, 36 are to be spread; such members being hinged at the distal ends of their U-shapes, indicated at 39, 40. The frame 31 is closed and with the machine totally inactive, the operator sets the work piece, so that at an end thereof, the perimetral lanes of the respective spreader wheels, are entered respectively, as shown in FIG. 2 or 5, into the channels, at the very ends thereof. Now, press down on the pedal 25. The first thing that happens is that the switch 29 closes. This brings the pusher roller 21 forward and it presses said channels 35, 36 onto the spreader wheels 18 and 19 respectively, thus spreading the very end regions of said channels at pivot pin 39, to be as shown in FIG. 6. Upon further downward movement of the pedal 25, the switch 30 will close. This causes the motor 16 to run and thereby the work 31 will automatically be forced to run in the direction of the arrow "A" as shown in FIG. 4, and so both channels will spread along their entire length, and when completed will leave the machine. The operator now allows the pedal 25 to rise to its normal rest position as shown in FIGS. 1 and 8, whereupon both switches 29, 30 will open and the machine will assume its normal rest condition as shown in FIGS. 1 and 2, ready for the next work piece.

When the work 31 has no protuberances as 37, the pusher roller 21 needs no tire, but one is provided as 38, when the frames have laterally extending elements as for instance the parts of locking means or handle attaching means. This tire is preferably of half-hard rubber or the like so that in passing, said elements will become embedded therein and will not interfere with the channel spreading operation. Of course, when clear channels are engaged, they will also compress the tire 38 to an extent, though this is not shown in FIGS. 3 and 4, but it exists, and is no hinderance to the operation. When a protuberance meets the tire 38, it will inbed itself deeper therein than when a straight run of channel stock is acted on.

Where the machine is to be used for running through a single channel at a time, it is evident that but a single spreading wheel would be required, in which instance both its surface may be bevelled to accomplish a required V-form out of the U-form channel cross-section, so that the distance between the distal ends of said V is greater than that between the distal ends of the U.

This invention is capable of numerous forms and various applications without departing from the essential features herein disclosed. It is therefore intended and desired that the embodiment shown herein shall be deemed illustrative and not restrictive and that the patent shall cover all patentable novelty herein set forth; reference being had to the following claims rather than to the specific description herein to indicate the scope of this invention.

I claim:

1. In a channel spreading apparatus of the character described, a frame, a spreading wheel rotatably mounted on the frame; said spreading wheel being one whose thickness increases from its periphery towards its center, a member slidably mounted on the frame for movement towards and away from said spreading wheel, a pusher wheel rotatably mounted on said member; the axes of rotation of said wheels being parallel, a tire carried on the pusher wheel for contacting and pushing the channel; said tire having the nature of half-hard rubber substantially whereby any projections on the exterior of the channel being worked on may become imbedded therein without hinderance to the channel spreading function of the apparatus, a cylinder apparatus operable by a gaseous medium, fixed on the frame and having its piston rod connected to said slidable member and means for turning one of said wheels while a channel is set on the said spreading wheel so that the faces of said spreading wheel are respectively adjacent the inner opposite walls of such channel and said cylinder apparatus is operated whereby said pusher wheel is moved towards said spreading wheel to push said channel onto said spreading wheel.

2. An apparatus as defined in claim 1, wherein the means to turn one of said wheels is an electric motor and the means to control the operation of the cylinder is a valve worked by a solenoid; said apparatus including a circuit powered by a source of electrical energy and having a switch means interposed in said circuit with an operating member therefor, which operating member when shifted in one direction will first actuate the said solenoid to operate said cylinder apparatus whereby said pusher wheel is shifted towards the spreading wheel and then will actuate the motor while the pusher wheel is in its said moved position.

3. An apparatus as defined in claim 2, wherein said switch means comprises a first switch and a second switch which are so associated with said operating member that upon movement of said operating member in one direction, it will first close the first switch and then will close the second switch and keep both said switches closed and wherein in said circuit, one of the terminals of the first switch is connected to one terminal of the solenoid, and one of the terminals of the second switch is connected to one of the terminals of the motor; the other terminals of said switches being connected to one terminal of the electrical energy supply source and the other terminals of said motor and solenoid, being connected to the other terminal of said supply source.

References Cited by the Examiner

UNITED STATES PATENTS 2,334,407  11/43  Grebe _____ 153—54
2,394,019  2/46   Socke.
3,034,562  5/62   Lancaster _____ 153—54

CHARLES W. LANHAM, *Primary Examiner.*